H. Fairbanks.
Flour Sieve.

N°48,668. Patented July 11, 1865.

Witnesses:

Inventor:
Horatio Fairbanks

UNITED STATES PATENT OFFICE.

HORATIO FAIRBANKS, OF BOSTON, MASSACHUSETTS.

FLOUR-SIFTER.

Specification forming part of Letters Patent No. 48,668, dated July 11, 1865.

*To all whom it may concern:*

Be it known that I, HORATIO FAIRBANKS, of Boston, in the county of Suffolk and State of Massachusetts, have invented an Improved Flour-Sifter, of which the following is a full, clear, and exact description, reference being had to the accompanying drawings, making part of this specification, in which—

Figure 3:
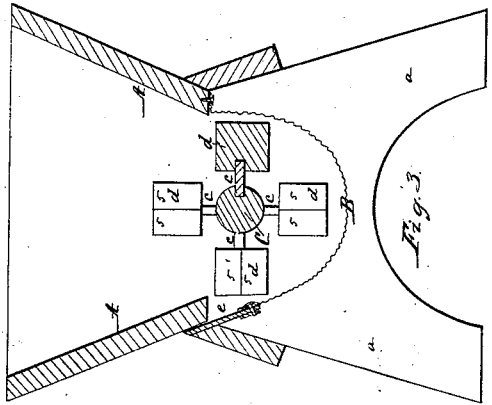
Figure 4:
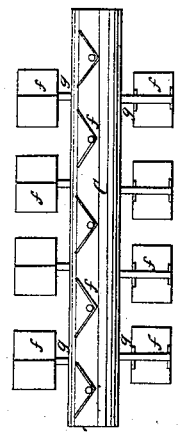
Figure 1:
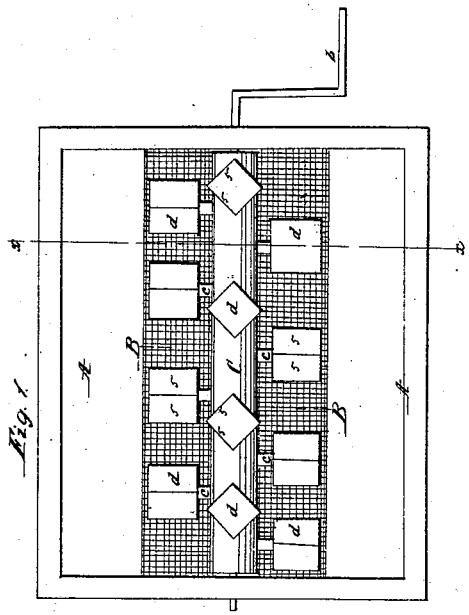
Figure 2:
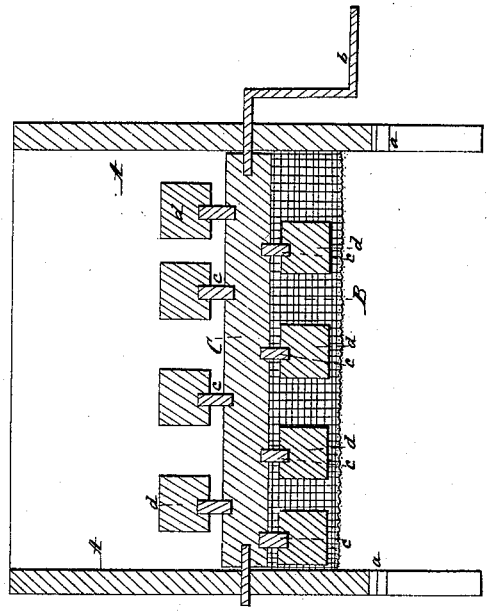

Figure 1 is a plan of my improved sifter. Fig. 2 is a central longitudinal section through the same. Fig. 3 is a transverse section through the same on the line $x\ x$ of Fig. 1. Fig. 4 is a modification of the revolving shaft, to be referred to hereinafter.

The object of this invention is to produce a flour-sifter that can be furnished at a low cost and shall perform its work in a rapid and effectual manner, and consists in a box or hopper provided with a sieve, and containing a revolving shaft having a series of angular projections, by means of which the flour is agitated and caused to pass rapidly through the sieve.

To enable others skilled in the art to understand and use my invention, I will proceed to describe the manner in which I have carried it out.

In the said drawings, A is a box or hopper, which is supported on legs $a$, and has attached to its lower end a sieve, B, of a curved form, as seen in Fig. 3.

C is a shaft which has its bearings in the ends of the box A, and is revolved by means of a handle, $b$. To this shaft are attached, by means of pins $c$, a series of blocks, $d$, placed with their diagonals transversely to and parallel with the shaft, and arranged in rows, those of one row being placed opposite to the spaces in the adjoining rows, so as to leave no portion of the flour untouched, and thus, as the shaft C is revolved, the flour is agitated by the blocks $d$, which break up the lumps and rub it across the sieve, causing the finer particles to pass rapidly through, any hard substances or other obstructions being forced to one side by the inclined sides 5 of the blocks $d$, as they come into contact with them, which prevents the sifter from becoming clogged.

One side of the sieve B is firmly attached to the box A, while the opposite side is fastened to a strip of rubber, $e$, which is secured to the side of the box A, as seen in Fig. 3, which allows the sieve to yield in the event of any hard substance being forced against it by the blocks $d$, thus preventing it from being pierced or otherwise damaged. If preferred, a rubber strip may be attached to both sides of the sieve.

In Fig. 4 is represented a modification of my invention, in which the blocks $d$ are replaced by angular pieces of metal, $f$, which are attached to pins $g$, driven into the shaft. I consider this, however, the entire equivalent of the blocks $d$ first described, their action being the same.

What I claim as my invention, and desire to secure by Letters Patent, is—

1. The revolving shaft C, carrying a series of angular projections, in combination with a box or hopper A and sieve B, substantially as and for the purpose set forth.

2. In combination with the above, attaching a rubber strip to one or both sides of the sieve B, substantially as and for the purpose described.

HORATIO FAIRBANKS.

Witnesses:
P. E. TESCHEMAKER,
W. J. CAMBRIDGE.